(12) United States Patent
Bungo

(10) Patent No.: US 6,795,180 B2
(45) Date of Patent: Sep. 21, 2004

(54) SPECTROPHOTOMETER

(75) Inventor: Hajime Bungo, Muko (JP)

(73) Assignee: Shimadzu Corporation, Kyoto (JP)

( * ) Notice: Subject to any disclaimer, the term of this patent is extended or adjusted under 35 U.S.C. 154(b) by 290 days.

(21) Appl. No.: 10/000,098

(22) Filed: Dec. 4, 2001

(65) Prior Publication Data

US 2002/0080352 A1 Jun. 27, 2002

(30) Foreign Application Priority Data

Dec. 27, 2000 (JP) .................................. 2000-398911

(51) Int. Cl.[7] .............................................. G01J 3/427
(52) U.S. Cl. ..................... 356/319; 356/326; 356/330
(58) Field of Search ................................ 356/319–331, 356/302, 213; 250/559.1, 216, 578.1, 234

(56) References Cited

U.S. PATENT DOCUMENTS

| 3,740,147 | A | * | 6/1973 | Kallet | 356/328 |
| 4,352,561 | A | * | 10/1982 | Tohyama et al. | 356/332 |
| 4,519,706 | A | * | 5/1985 | Morley et al. | 356/319 |
| 4,692,883 | A | * | 9/1987 | Nelson et al. | 356/319 |
| 4,822,168 | A | * | 4/1989 | Nogami et al. | 356/319 |
| 5,715,061 | A | * | 2/1998 | Fujiwara | 356/623 |
| 6,304,324 | B1 | * | 10/2001 | Iwasaki | 356/320 |
| 6,307,204 | B1 | * | 10/2001 | Kanomata et al. | 250/373 |
| 6,377,899 | B1 | * | 4/2002 | Sakai et al. | 702/104 |
| 6,559,941 | B1 | * | 5/2003 | Hammer | 356/319 |

FOREIGN PATENT DOCUMENTS

JP 02000074820 A * 3/2000 .......... G01N/21/01

* cited by examiner

Primary Examiner—Frank G. Font
Assistant Examiner—Layla Lauchman
(74) Attorney, Agent, or Firm—Manabu Kanesaka

(57) ABSTRACT

In a spectrophotometer, a position of a motor corresponding to a 254 nm bright line in the last check is read out from a memory section, and only a low-pressure mercury lamp is lighted up to scan a grating around the 254 nm line position in the last check, so that the 254 nm line position where a 254 nm line is ejected on a cell is detected. The low-pressure mercury lamp is turned off, and after only a $D_2$ lamp is lighted up, the grating is scanned to detect an original position where an original or zero-order light is ejected on the cell and a 656 nm line position where a 656 nm line is ejected on the cell. Then, based on the 254 nm line position and the 656 nm line position which are actually measured, wavelength check is carried out.

8 Claims, 4 Drawing Sheets

SPECTROPHOTOMETER

BACKGROUND OF THE INVENTION AND RELATED ART STATEMENT

The present invention relates to a spectrophotometer, which can be used by itself, or used as a detecting section in a liquid chromatograph.

FIG. 3 is a schematic view showing a conventional spectrophotometer. A light from a $D_2$ lamp (deuterium discharge tube) 2 as a light source is sent to a mirror 4 via an optical system, not shown, which is formed of a lens, a mirror, a slit and the like. The light reflected by the mirror 4 is sent to a grating 6, and is divided by the grating 6. Then, the light with a specific wavelength is irradiated via a mirror 8 to a flow cell 10 disposed at a detection position. The light from the cell 10 is detected by a photodiode 12 as an optical sensor.

The grating 6 is rotated by a grating driving motor 14 and sends light having different wavelengths to the mirror 8 and the cell 10 in accordance with an angle of the grating 6. Also, there is provided a grating home position sensor 16 for detecting a predetermined position (home position) which becomes a reference at the time of determining the angle of the grating 6.

In the detector as described above, in order to confirm that the light is properly dispersed or provided in accordance with the set wavelengths, when the power is switched on, a position of the grating 6 called an original position, or also called a zero-order light position where a zero-order light or original of the $D_2$ lamp is received on the cell 10, a position of the grating 6 called a 486 nm bright line position where a bright line in a wavelength of 486 nm of the $D_2$ lamp is received, and a position of the grating 6 called a 656 nm bright line position where a bright line in a wavelength of 656 nm is received, are detected to carry out a wavelength check. FIG. 4 is a waveform diagram showing a spectrum of $D_2$ lamp.

In explaining operations at the time of switching on the power supply, after the power supply is switched on, the $D_2$ lamp 2 is lighted up, and the grating 6 is rotated in a direction toward the sensor 16 by the grating driving motor 14. When the sensor 16 responds thereto to become "OFF" from "ON", the rotation of the grating 6 is stopped, and the grating 6 is located at the home position.

Next, a transmitted light from the cell 10 is detected by the optical sensor 12, and while being monitored, the grating driving motor 14 is driven, so that the grating 6 is rotated step by step from the home position to thereby scan a certain angle range which is determined in advance. Accordingly, a position of the grating 6 where an amount of the light transmitted through the cell is the largest is obtained, and this position is stored as an original position.

Further, based on the original position as a reference, the grating 6 is rotated step by step, to thereby carry out the detection of the 486 nm bright line position and the 656 nm bright line position of the grating 6. From a relational expression, which is determined in advance, between a number of steps of the grating driving motor 14 and the wavelength, a number of steps from the original position corresponding to the 486 nm bright line position and a number of the steps from the origin position corresponding to the 656 nm bright line position are respectively calculated. The number of the steps at the time of detecting the bright line is compared with the number of the steps obtained by the relational expression, so as to carry out the wavelength check.

In case the spectrophotometer shown in FIG. 3 is applied to a detector of the liquid chromatograph, since an absorption of light by a sample generally occurs in the short wavelength region around 210 nm to 300 nm in the liquid chromatograph, the spectrophotometer is used by setting the detected wavelength at the short wavelength region (refer to arrows showing a wavelength region used for detection in FIG. 4).

In the spectrophotometer shown in FIG. 3, the wavelength check is carried out in the wavelength regions (486 nm and 656 nm) which are different from the short wavelength region used for detection. As described above, in case the wavelength region used for the detection differs from the wavelength region used for the wavelength check, the wavelength accuracy is lowered or deteriorated. Thus, it is preferable to carry out the wavelength check in the wavelength region used for detection.

Accordingly, an object of the invention is to provide a spectrophotometer which can carry out a wavelength check in a wavelength region used for detection.

Further objects and advantages of the invention will be apparent from the following description of the invention.

SUMMARY OF THE INVENTION

To achieve the aforementioned object, the present invention provides a spectrophotometer which comprises an optical system for irradiating light from a light source to a detection position; a light detecting section for detecting the light from the detection position; a spectral element driving mechanism for changing an angle of a spectral element provided on an optical path between the light source and the detection position or an optical path between the detection position and the light detecting section; and a reference position detecting section for detecting a reference position of the spectral element where a zero-order light or the bright line is irradiated to the detection position based on electric signals from the light detecting section and the dispersing element driving mechanism. As the light source, the spectrophotometer of the invention includes therein a lamp for detection, which is provided for irradiating a light in a wavelength region used for detection, and a lamp for wavelength check, which has a bright line in the wavelength region used for detection.

By detecting the reference position of the spectral element by using the bright line of the lamp for wavelength check within the wavelength region used for detection, the wavelength check in the wavelength region used for detection is carried out. Accordingly, an accuracy of the spectral wavelength can be improved.

Throughout the specification, the reference positions mean an original position at the spectral element where zero-order or original light of the lamp for detection is ejected, and the bright line positions at the spectral element where the bright lines of the lamp for detection and the lamp for wavelength check are respectively ejected.

BRIEF DESCRIPTION OF THE DRAWINGS

FIG. 2 is a flow chart showing an operation of the embodiment when a power supply is switched on;

DETAILED DESCRIPTION OF PREFERRED EMBODIMENTS

In a spectrophotometer of the invention, examples of a lamp for detection and a lamp for wavelength check are a $D_2$ lamp as the lamp for detection and a low-pressure mercury lamp as the lamp for wavelength check.

In the spectrophotometer of the invention, at least one of the lamp for detection and the lamp for wavelength check is a see-through type, and it is preferable to dispose the lamp for detection and the lamp for wavelength check on the same optical path. As a result, the optical path of the lamp for detection and the optical path for wavelength check can be combined, so that the reliability of the wavelength check can be improved. As the structural example of the arrangement, there can be exemplified a structure of arranging in the order of a lamp for wavelength check, a lamp for detection of a see-through type, and an optical system, or a structure of arranging in the order of a lamp for detection, a lamp for wavelength check of a see-through type, and an optical system.

In the spectrophotometer of the invention, especially in the structure in which the lamp for detection and the lamp for wavelength check are disposed on the same optical path, when the wavelength check is carried out in the condition that the lamp for detection and the lamp for wavelength check are lighted up at the same time, there might be a case that the bright lines can not be detected depending on the combination of the lamp for detection and the lamp for wavelength check.

Figure 5:
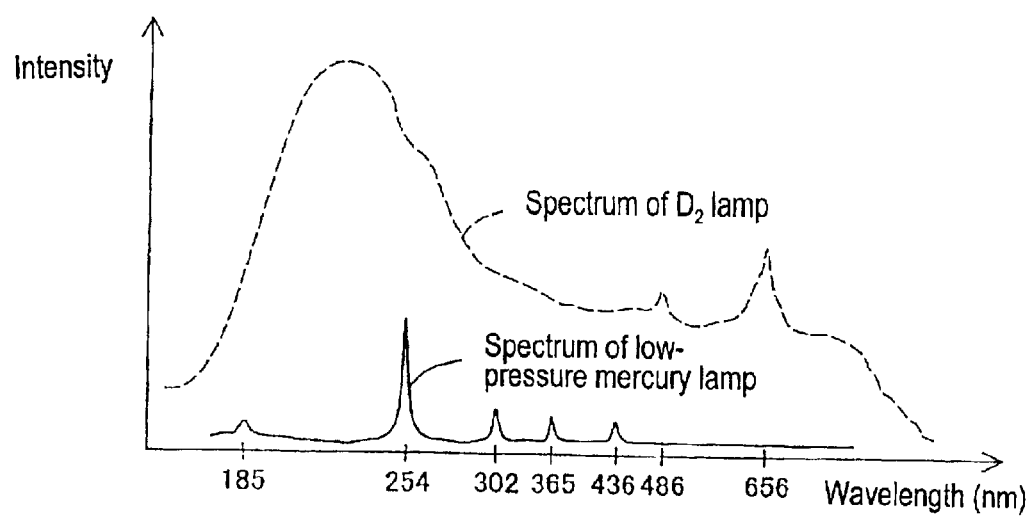
FIG. 5 is a waveform diagram showing a spectrum of a low-pressure mercury lamp and a spectrum of the $D_2$ lamp, wherein a solid line indicates the spectrum of the low-pressure mercury lamp and a broken line indicates the spectrum of the $D_2$ lamp.

For example, in case the $D_2$ lamp is used as the lamp for detection and the low-pressure mercury lamp having the bright line at 254 nm is used as the lamp for wavelength check, as understood from the spectrum of the low-pressure mercury lamp shown by a solid line and the spectrum of the $D_2$ lamp shown by the broken line in FIG. 5, since an intensity of the light at 254 nm is higher in the $D_2$ lamp, there is a problem that the bright line at 254 nm of the low-pressure mercury lamp can not be detected in the condition that the $D_2$ lamp and the low-pressure mercury lamp are lighted up at the same time.

In order to solve the aforementioned problem, it is necessary to turn off the $D_2$ lamp as the lamp for detection when the bright line of the low-pressure mercury lamp as the lamp for wavelength check is checked. However, there is a problem that the life of the lamp for detection is shortened if on/off turnings of the lamp for detection are repeated.

Therefore, in a reference position detecting section of the spectrophotometer of the invention, it is preferable to control operations of on/off turnings of the lamp for detection and the lamp for wavelength check, and operations of a spectral element driving mechanism and a light detecting section such that when the power supply is switched on, only the lamp for wavelength check is lighted up to detect a reference position of the bright line of the lamp for wavelength check, and thereafter, the lamp for detection is lighted up to detect a reference position of a zero-order light of the lamp for detection or a reference position of the bright or bright line. As a result, it is not necessary to turn off the lamp for detection at the time of wavelength check when the power supply is switched on, and an operation of lighting up the lamp for detection can be made only once, so that the lowering the life of the lamp for detection can be prevented.

Figure 1:
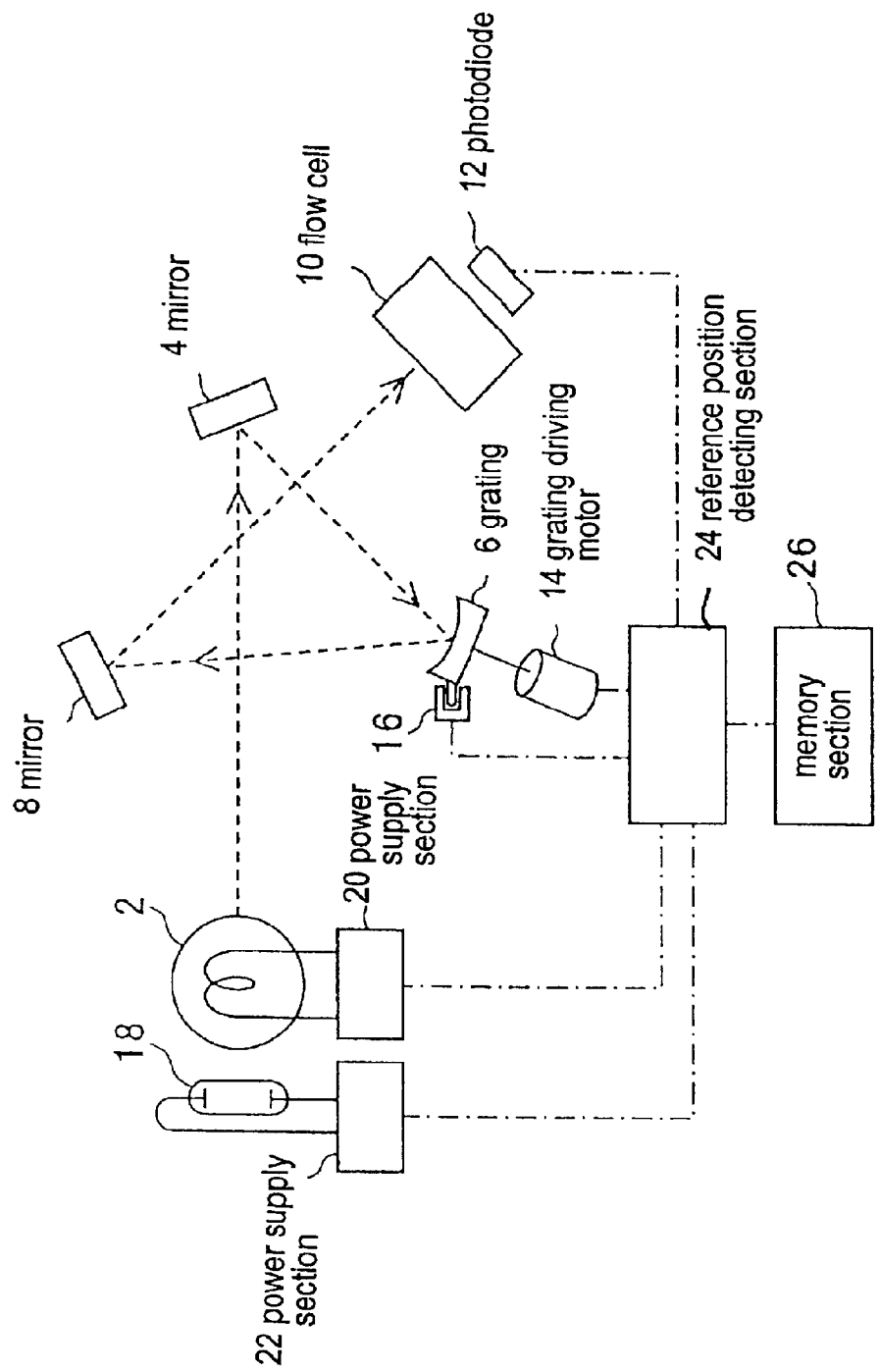
FIG. 1 is a schematic structural view of an embodiment of the invention, partly shown in a block diagram.
Figure 3:
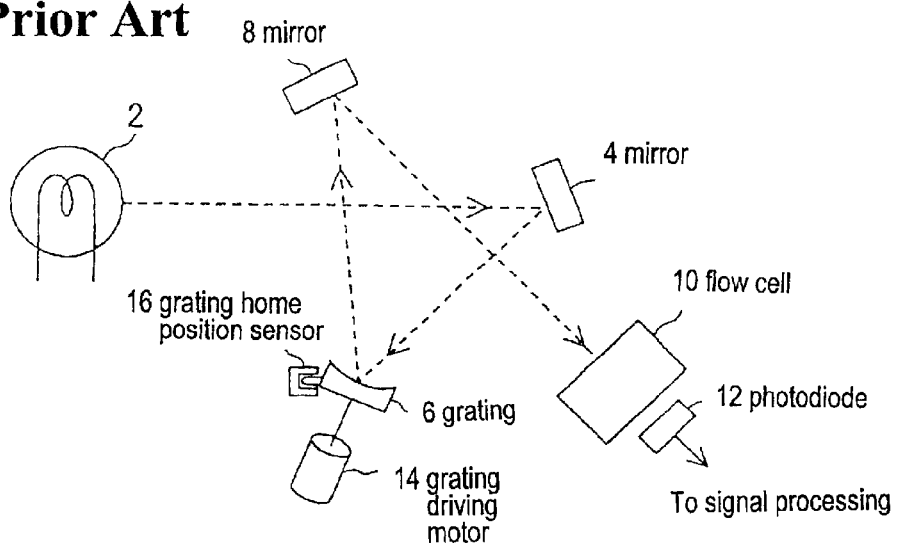
FIG. 3 is a schematic structural view showing a conventional spectrophotometer.
Figure 4:
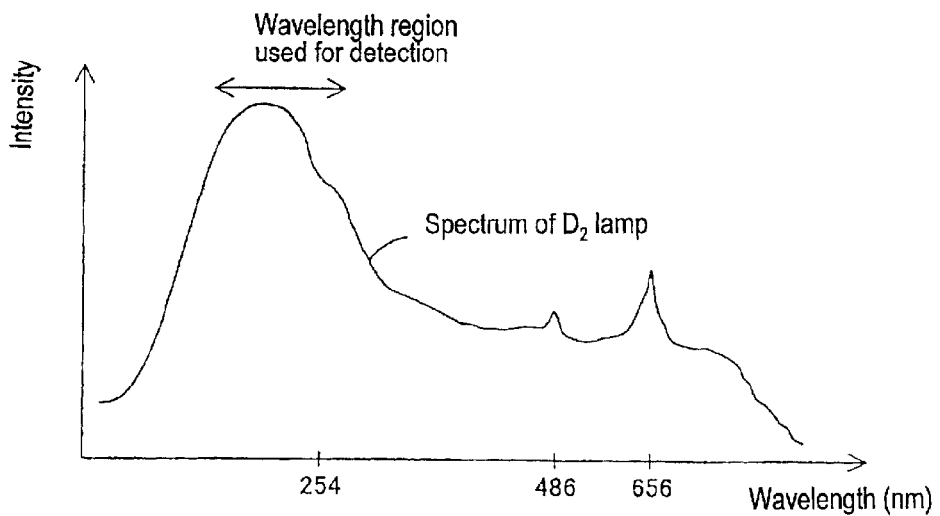
FIG. 4 is a waveform diagram showing a spectrum of a $D_2$ lamp.

FIG. 1 is a schematic structural view of an embodiment of the invention, partly shown in a block diagram. The constituents same as those shown in FIG. 3 are designated by the same reference numerals.

A $D_2$ lamp 2 and a low-pressure mercury lamp 18 are built in as a light source. The $D_2$ lamp 2 is electrically connected to a power supply section 20, and is turned on and off by the power supply section 20. The low-pressure mercury lamp 18 is electrically connected to a power supply section 22, and is turned on and off by the power supply section 22. The $D_2$ lamp 2 and the low-pressure mercury lamp 18 are disposed on the same optical path. The $D_2$ lamp 2 is a see-through type, and the light from the low-pressure mercury lamp 18 is transmitted through the $D_2$ lamp 2.

The light from the optical path of the $D_2$ lamp 2 and the low-pressure mercury lamp 18 is sent to the mirror 4 via an optical system (not shown in the figure) formed of a lens, a mirror, a slit and the like. The light reflected by the mirror 4 is sent to the grating 6, and the light is divided by the grating 6. Then, the light with the specific wavelength is irradiated to a flow cell 10 disposed at a detection position via a mirror 8. The light from the cell 10 is detected by a photodiode 12 as a light detecting section. A main optical system forming the present invention is formed of the optical system disposed between the $D_2$ lamp 2 and the mirror 4, the mirror 4, the grating 6, and the mirror 8.

Around the grating 6, there are provided a grating driving motor 14 as a spectral element driving mechanism, and a grating home position sensor 16.

The photodiode 12, the grating driving motor 14, the home position sensor 16 and the power supply sections 20 and 22 are electrically connected to a reference position detecting section 24 which controls operations of these constituents when the power supply is switched on and at the time of wavelength check. Also, the reference position detecting section 24 is electrically connected to a memory section 26 which stores the reference positions of the grating 6 and a result of the wavelength check. The reference positions of the grating 6 stored in the memory section 26 are, for example, an original position corresponding to the zero-order or original light of the $D_2$ lamp 2, a 254 nm position corresponding to the bright line at 254 nm of the low-pressure mercury lamp 18, and a 656 nm position corresponding to the bright line at 656 nm of the $D_2$ lamp 2. The memory section 26 is provided for storing information non-erasably, and information stored in the memory section 26 is not erased even if the power supply of the device is switched off.

Figure 2:
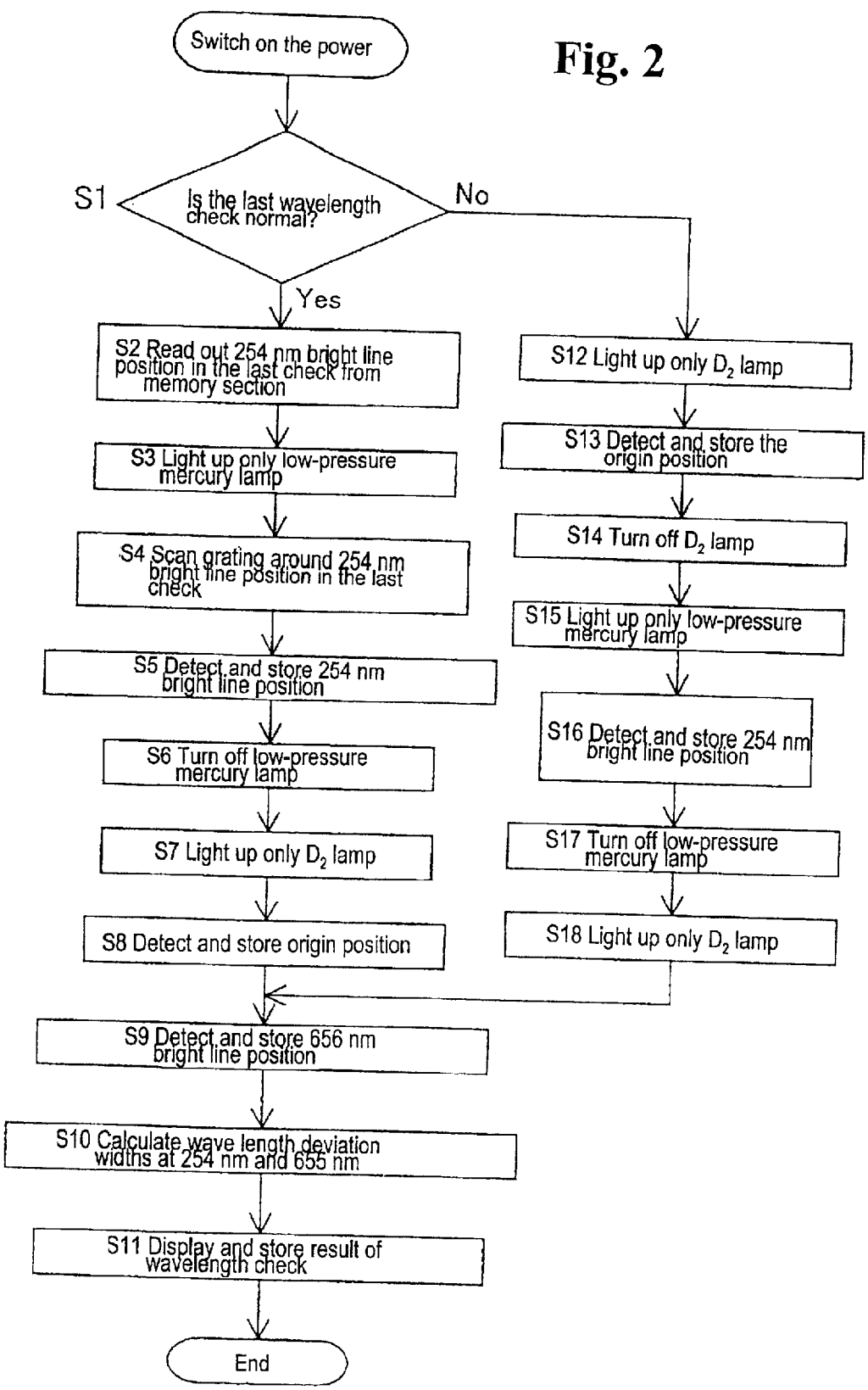

FIG. 2 is a flow chart showing operations of the embodiment when the power supply is switched on. The operations of the embodiment will be explained with reference to FIG. 1 and FIG. 2.

When the power supply of the spectrophotometer is switched on, the reference position detecting section 24 reads out a result of the last wavelength check, to determine whether the last wavelength check was normal or abnormal (step S1).

If it is determined that the last wavelength check was normal (Yes), the 254 nm bright line position in the last check is read out from the memory section 26 (step S2).

Then, the power supply section 22 is controlled to light up only the low-pressure mercury lamp 18 (step S3), and the grating 6 is scanned around the 254 nm bright line position in the last check by driving the grating driving motor 14, to thereby carry out the search of the position of the grating 6 where the bright line at 254 nm is emitted on the cell 10 (step S4). At this moment, the $D_2$ lamp 2 is turned off. Based on the detection signals of the photodiode 12 and the home position sensor 16, the position or step position of the grating driving motor 14 where the bright line at 254 nm is ejected on the cell 10 is detected, and the position is stored as the 254 nm bright line position in the memory section 26 (step S5).

After the low-pressure mercury lamp 18 is turned off by controlling the power supply section 22 (step S6), the power supply section 20 is controlled to light up only the $D_2$ lamp 2 (step S7). By driving the grating driving motor 14, and based on the detection signals of the photodiode 12 and the home position sensor 16, a position or step position of the grating driving motor 14 where the zero-order light is ejected on the cell 10 is detected, and the position is stored as an original position in the memory section 26 (step S8).

Based on the detected original position, the grating driving motor 14 is driven, and based on the detection signal of the photodiode 12, a position or step position of the grating driving motor 14 where a bright line at 656 nm is ejected on the cell 10 is detected, and the position is stored as a 656 nm bright line position in the memory section 26 (step S9).

A wavelength deviation width between the 254 nm bright line position, which is obtained by a relational expression determined in advance between a number of steps or rotations of the grating driving motor 14 and a wavelength set value, and the actually measured 254 nm bright line position, and a wavelength deviation width between the 656 nm bright line position, which is obtained by the relational expression, and the actually measured 656 bright line, are respectively calculated to carry out the wavelength check (step S10), and a result of the wavelength check is displayed, and stored in the memory section 26 (step S11).

Explanation will be continued by returning to the step S1. At the step S1, when the last wavelength check is determined as an abnormal (No), the power supply section 20 is controlled to light up the $D_2$ lamp 2 (step S12). At this moment, the low-pressure mercury lamp 18 is turned off. By driving the grating driving motor 14, and based on the detection signals of the photodiode 12 and the home position sensor 16, there is detected a position or step position of the grating driving motor 14 where the zero-order light is ejected onto the cell 10, and the step position is stored as an original position in the memory section 26 (step S13).

The power supply section 20 is controlled to turn off the $D_2$ lamp 2 (step S14), and the power supply section 22 is controlled to light up only the low-pressure mercury lamp 18 (step S15). Based on the detected original position, the grating driving motor 14 is driven, and based on the detection signal of the photodiode 12, there is detected a step position where the bright line at 254 nm is ejected on the cell 10, and the position is stored as the 254 nm bright line position in the memory section 26 (step S16).

By controlling the power supply section 22, the low-pressure mercury lamp 18 is turned off (step S17), and the power supply section 20 is controlled to light up only the $D_2$ lamp 2 (step S18). Thereafter, detection of the 656 nm bright line position and the wavelength check are carried out by following the step S9 to step S11.

As described above, since the wavelength check at 254 nm is carried out by using the low-pressure mercury lamp 18, even if the $D_2$ lamp 2 is used as the light source for the short wavelength region, the accuracy of the wavelength of the light irradiated to the detection position can be improved.

In this embodiment, if the last wavelength check is normal, when the power supply is switched on, before the original position of the $D_2$ lamp 2 is detected, only the low-pressure mercury lamp 18 is turned on in advance to detect the 254 nm bright line position, and thereafter, the original position and 656 nm bright line position are detected, so that the 254 nm bright line position is converted later.

Accordingly, by lighting up the $D_2$ lamp 2 only once while the power is on, the detection of the origin position and the wavelength checks at 254 nm and at 656 nm can be carried out, so that the life of the $D_2$ lamp 2 can be prolonged as compared to the case that the $D_2$ lamp 2 is turned on twice.

Furthermore, it is necessary to preheat the $D_2$ lamp 2 for about 30 seconds in order to light up the $D_2$ lamp 2, and in case the last wavelength check was normal, lighting of the $D_2$ lamp 2 is required just once, so that time required for wavelength check can be shortened as compared with the case that the $D_2$ lamp 2 is lighted up twice.

In this embodiment, when the low-pressure mercury lamp 18 is lighted up, only the position corresponding to the bright line at 254 nm is detected. However, the present invention is not limited thereto, and there can be detected a position corresponding to one of a bright line at 185 nm, a bright line at 302 nm, a bright line at 365 nm, and a bright line at 436 nm (refer to FIG. 5), or there can be detected positions corresponding to a combination of or all of these bright lines. In these cases, the reliability of the wavelength check can be improved.

In this embodiment, the see-through type of the $D_2$ lamp 2 is used, and the $D_2$ lamp 2 and the low-pressure mercury lamp are disposed on the same optical path. However, the present invention is not limited thereto, and the $D_2$ lamp 2 and the low-pressure mercury lamp can be disposed on the same optical path by using a see-through type of the low-pressure mercury lamp. Alternatively, an optical path switching mechanism can be disposed between the $D_2$ lamp and the low-pressure mercury lamp, and by switching the optical path switching mechanism, one of the $D_2$ lamp and the low-pressure mercury lamp can be selected. However, it is preferable to dispose the $D_2$ lamp and the low-pressure mercury lamp on the same optical path in order to prevent the deviation of the optical path.

Although the grating 6 as the spectral element is disposed on the optical path between the light sources 2, 18 and the detection position in the embodiment, the present invention is not limited thereto, and the spectral element can be disposed on the optical path between the detection position and the light detecting section.

In the embodiment, the $D_2$ lamp is used as the lamp for detection, and the low-pressure mercury lamp is used as the lamp for wavelength check. However, the light sources forming the present invention are not limited thereto, and other lamps can be used as long as the lamps are the lamp for detection and the lamp for wavelength check having the bright line in the wavelength region used for detection.

In the spectrophotometer of the invention, as the light sources, the lamp for detection, which is provided for irradiating the light in the wavelength region used for detection, and the lamp for wavelength check, which has the bright line in the wavelength used for detection, are built therein, to thereby detect the reference position of the spectral element by using the bright line of the lamp for wavelength check which is within the wavelength region used for detection. Therefore, the wavelength check can be carried out in the wavelength region used for detection, so that the accuracy of the spectral wavelength can be improved.

Also, at least one of the lamp for detection and the lamp for wavelength check is a see-through type, and if the lamp for detection and the lamp for wavelength lamp are disposed on the same optical path, the optical path of the lamp for detection and optical path of the lamp for wavelength check can be combined, so that the reliability of the wavelength check can be improved.

Further, in the reference position detecting section, on/off turnings of the lamp for detection and the lamp for wavelength check, and operations of the spectral element driving mechanism and the light detecting section are controlled such that after only the lamp for wavelength check is lighted up to detect the reference position of the bright line, the lamp for detection is lighted up to detect the reference position of the zero-order light or the reference position of the bright line. Accordingly, it is not necessary to turn off the lamp for detection at the time of wavelength check when the power supply is switched on, so that lighting up of the lamp for detection can be made only once, to thereby prevent shortening the life of the lamp for detection.

While the invention has been explained with reference to the specific embodiments of the invention, the explanation is illustrative and the invention is limited only by the appended claims.

What is claimed is:

1. A spectrophotometer comprising:
   a light source including a detection lamp for irradiating light having a first bright line and a predetermined wavelength region, and a wavelength check lamp for irradiating light having a second bright line in the predetermined wavelength region,
   an optical system for guiding the light from the light source to a detection position and providing a zero-order light by the detection lamp,
   a light detecting section for detecting the light from the light source passing through the detection position,
   a spectral element provided on one of an optical path between the light source and the detection position and an optical path between the detection position and the light detecting section,
   a spectral element driving mechanism connected to the spectral element for changing an angle of the spectral element, and
   a reference position detecting section for detecting a first reference position of the spectral element where the first bright line of the light from the detection lamp is ejected on the detection position, a second reference position of the spectral element where the second bright line of the light from the wavelength check lamp is ejected on the detection position, and a third reference position of the spectral element where as the zero-order light, the detection lamp is ejected on the detection position, said reference position detecting section controlling the light source to turn on only the wavelength check lamp to detect the second reference position when the spectrophotometer is turned on, said reference position detecting section controlling the light source to turn on only the detection lamp to detect the first and third reference positions after the second reference position is detected.

2. A spectrophotometer according to claim 1, wherein the detection lamp is formed of a $D_2$ lamp and the wavelength check lamp is formed of a low-pressure mercury lamp.

3. A spectrophotometer according to claim 1, wherein at least one of the detection lamp and the wavelength check lamp is a see-through type, the detection lamp and the wavelength check lamp being disposed on a same optical path.

4. A spectrophotometer according to claim 1, wherein the reference position detecting section controls operations of turning on and off the detection lamp, operations of turning on and off the wavelength check lamp, operations of the spectral element driving mechanism, and operations of the light detecting section such that after the spectrophotometer is turned on, only the wavelength check lamp is turned on to detect the second reference position using the second bright line of the wavelength check lamp, and only the detection lamp is turned on to detect the first reference position using the first light of the detection lamp and the third reference position using the zero-order light of the detection lamp.

5. A spectrophotometer according to claim 1, further comprising a home position sensor electrically connected to the reference position detecting section for checking the angle of the spectral element with reference to a number of steps of the spectral element driving mechanism.

6. A spectrophotometer according to claim 1, further comprising a memory section electrically connected to the reference position detecting section for storing the first, second and third reference positions of the spectral element.

7. A spectrophotometer according to claim 6, wherein said reference position detecting section is operated to compare the first and second reference positions of the spectral element stored in the memory section with calculated first and second reference positions obtained by a relationship between the angle of the spectral element and a frequency of the light determined in advance.

8. A spectrophotometer according to claim 7, wherein said reference position detecting section controls the light source to turn on only the detection lamp to detect the third reference position before turning on the wavelength check lamp when the calculated first and second reference positions are deviated from the first and second reference positions detected in a previous run.

* * * * *